(12) United States Patent
Demetriades

(10) Patent No.: US 8,760,122 B2
(45) Date of Patent: Jun. 24, 2014

(54) MODULAR MULTILEVEL CONVERTER WITH CELL-CONNECTED BATTERY STORAGES

(75) Inventor: Georgios Demetriades, Västerås (SE)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 14/110,082

(22) PCT Filed: Apr. 5, 2011

(86) PCT No.: PCT/EP2011/055293
§ 371 (c)(1),
(2), (4) Date: Oct. 4, 2013

(87) PCT Pub. No.: WO2012/136252
PCT Pub. Date: Oct. 11, 2012

(65) Prior Publication Data
US 2014/0028266 A1    Jan. 30, 2014

(51) Int. Cl.
*H02J 7/00*    (2006.01)
(52) U.S. Cl.
USPC .......................................... 320/136; 320/107
(58) Field of Classification Search
USPC .................. 320/107, 126, 133, 136, 155, 166
See application file for complete search history.

(56) References Cited

U.S. PATENT DOCUMENTS

| | | | |
|---|---|---|---|
| 6,700,351 B2 * | 3/2004 | Blair et al. | ................... 320/125 |
| 2008/0205093 A1 | 8/2008 | Davies et al. | |
| 2008/0252142 A1 | 10/2008 | Davies et al. | |
| 2012/0043816 A1 | 2/2012 | Pereira | |

FOREIGN PATENT DOCUMENTS

| | | |
|---|---|---|
| DE | 101 03 031 A1 | 7/2002 |
| WO | WO 2007/028349 A1 | 3/2007 |
| WO | WO 2010/102667 A1 | 9/2010 |
| WO | WO 2010/124706 A1 | 11/2010 |
| WO | WO 2011/103911 A1 | 9/2011 |
| WO | WO 2011/147927 A1 | 12/2011 |

OTHER PUBLICATIONS

Baran et al., "STATCOM with Energy Storage for Smoothing Intermittent Wind Farm Power", Power and Energy Society General Meeting Conversion and Delivery of Electricla Energy in the 21st Century, IEEE, pp. 1-6, Jul. 20, 2008.
Hirofumi Akagi, Classification, Terminology, and Application of the Modular Multilevel Cascade Converter (MMCC), The 2010 International Power Electronics Conference, IEEE, pp. 508-515, Jun. 21, 2010.

* cited by examiner

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

The invention concerns a method, voltage source converter and computer program product for supporting an associate AC system and comprising: a number of cells (CA1, CA2, CA3, CA4, CA5, CA6, CB1, CB2, CB3, CB4, CB5, CB6, CC1, CC2, CC3, CC4, CC5, CC6), each cell comprising a string of switching elements in parallel with a cell capacitor, at least some cells further including a battery module group comprising at least one battery module connectable in parallel with the cell capacitor and a control unit (20) configured to selectively connect the battery module groups of a number of cells in parallel with corresponding cell capacitors for exchanging power with the associated AC system.

20 Claims, 4 Drawing Sheets

MODULAR MULTILEVEL CONVERTER WITH CELL-CONNECTED BATTERY STORAGES

FIELD OF INVENTION

The present invention generally relates to voltage source converters. More particularly the present invention relates to a method, voltage source converter and computer program product for supporting an alternating current system.

BACKGROUND

Direct Current (DC) systems or Grids and DC interconnections are often connected to alternating current (AC) transmission systems. Both AC and DC systems have recently seen important changes. The AC systems are today more and more connected to non-linear sources or generators, such as wind farms. These are of interest to use as sources from an environmental point of view. However, since such sources of energy are used the systems are not stable. This means that in order to increase the stability, they have to be supported. One way of supporting a system is through providing an energy storage system capable of receiving energy from, and to deliver energy to, the AC system. The support can here involve a number of different types of applications, such as transmission enhancement, power oscillation damping, dynamic voltage stability, tie line control, short-term spinning reserve, load leveling, under-frequency load shedding reduction, sub-synchronous resonance damping, and power quality improvement.

One way of providing this energy storage system is through the use of a bank of battery modules. Normally such battery modules are connected to the AC grid via a separate AC/DC converter.

However, as DC systems are becoming more interesting to use in relation to AC systems, it would be of interest to use these DC systems also for supporting an AC system.

It was previously mentioned that there has been important changes also in DC systems. One such change is the introduction of the cell based voltage source converter. This converter, which is for instance described in DE 10103031 is made up of a number of cells, each including a number of switching elements and a cell capacitor. The cells can here be controlled to provide a voltage contribution using the cell capacitors, where the voltage contribution from the various cells forms an AC voltage.

In order to smooth the DC voltage on a DC line these cells can also include a further energy storage means in parallel with the cell capacitor, where the further energy storage means may be a battery. Cells with this type of further energy storage means are briefly mentioned in US 2008/0205093 and US 2008/0252142.

There is in view of what has been described above a need for a DC system that can be used for stabilizing an AC system using an energy storage system comprising battery modules.

SUMMARY OF THE INVENTION

The present invention is directed towards supporting an AC system using battery module groups provided in the cells of a cell based voltage source converter.

One object of the present invention is to provide a new method for supporting an AC system.

This object is according to a first aspect of the present invention achieved through a method for supporting an AC system via a cell based voltage source converter, each cell comprising a string of switching elements in parallel with a cell capacitor and each of at least some cells further including a battery module group comprising at least one battery module connectable in parallel with the cell capacitor, the method comprising the steps of:
obtaining data regarding a power requirement of the AC system,
selecting battery module groups of a number of cells for fulfilling the power requirement, and
connecting the selected battery module groups in parallel with corresponding cell capacitors for exchanging power with the AC system.

Another object of the present invention is to provide a cell based voltage source converter for supporting an associated AC system.

This object is according to a second aspect of the present invention achieved through a voltage source converter for supporting an associated AC system and comprising:
a number of cells, each cell comprising a string of switching elements in parallel with a cell capacitor, at least some cells further including a battery module group comprising at least one battery connectable in parallel with the cell capacitor, and
a control unit configured to selectively connect the battery module groups of a number of cells in parallel with corresponding cell capacitors for exchanging power with the associated AC system.

Another object of the present invention is to provide a computer program product for supporting an AC system using a cell based voltage source converter.

This object is according to a third aspect of the present invention achieved through computer program product for supporting an AC system associated with a cell based voltage source converter, where each cell comprises a string of switching elements in parallel with a cell capacitor and at least some cells further includes a battery module group comprising at least one battery module connectable in parallel with the cell capacitor, the computer program product comprising a data carrier with computer program code being loadable into a control unit of the voltage source converter, the computer program code causing the control unit to, when being loaded in the control unit,
obtain data regarding a power requirement of the associated AC system,
select battery module groups of a number of cells for fulfilling the power requirement, and
connect the selected battery module groups in parallel with corresponding cell capacitors for exchanging power with the associated AC system.

The present invention has a number of advantages. It can be provided without a power electronics interface for the energy storage system. The energy storage system does furthermore not require any galvanic isolation from the DC system in terms of medium/high-frequency transformer. All cells or a number of cells can be used according to the system requirements. The control of energy storage system is performed on a cell level and therefore only a number of cells employing battery module groups are connected at a certain time instant. The energy storage system is connected at a low voltage, i.e. at the cell voltage. The energy storage system also has a low footprint compared with the use of a separate power electronics interface. The costs are furthermore low as is the complexity.

BRIEF DESCRIPTION OF THE DRAWINGS

The present invention will in the following be described with reference being made to the accompanying drawings, where FIG. 1 schematically shows a DC power transmission system being connected between two AC power lines of two AC power systems, FIG. 2 schematically shows a cell based voltage source converter, FIG. 3 schematically shows the structure of a first type of voltage source converter cell equipped with a first battery module group, FIG. 4 schematically shows the structure of a second type of voltage source converter cell also equipped with a first battery module group.

DETAILED DESCRIPTION OF THE INVENTION

In the following, a detailed description of preferred embodiments of the invention will be given.

Figure 1:
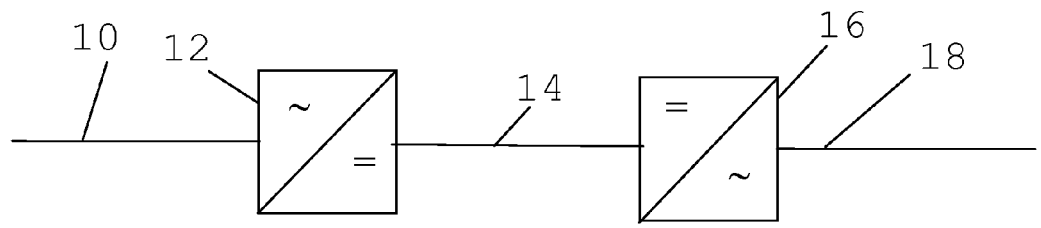

FIG. 1 shows a single line diagram of a simplified Direct Current (DC) power line 14 being connected between two Alternating Current (AC) power lines 10 and 18 via two voltage source converters 12 and 16. The DC power line 14 may be provided as a part of a DC power transmission system and may with advantage be a part of a High Voltage Direct Current (HVDC) system. Thus, there is here a first voltage source converter 12 having an AC side connected to a first AC power line 10 and a DC side connected to a first end of the DC power line 14. There is also a second voltage source converter 16 having an AC side connected to a second AC power line 18 and a DC side connected to a second end of the DC power line 14. The AC power lines 10 and 18 may here be provided in different AC power transmission and/or distribution systems, where at least one of these AC systems may be a system requiring support, like a weak AC system. A system may for instance require support because it uses wind farms as generators. The DC power transmission system 20 may also be termed a DC grid and one or both of the AC systems may be termed an AC grid.

It should here be realized that the DC power transmission system can be more complex and include several more DC power lines.

Figure 2:
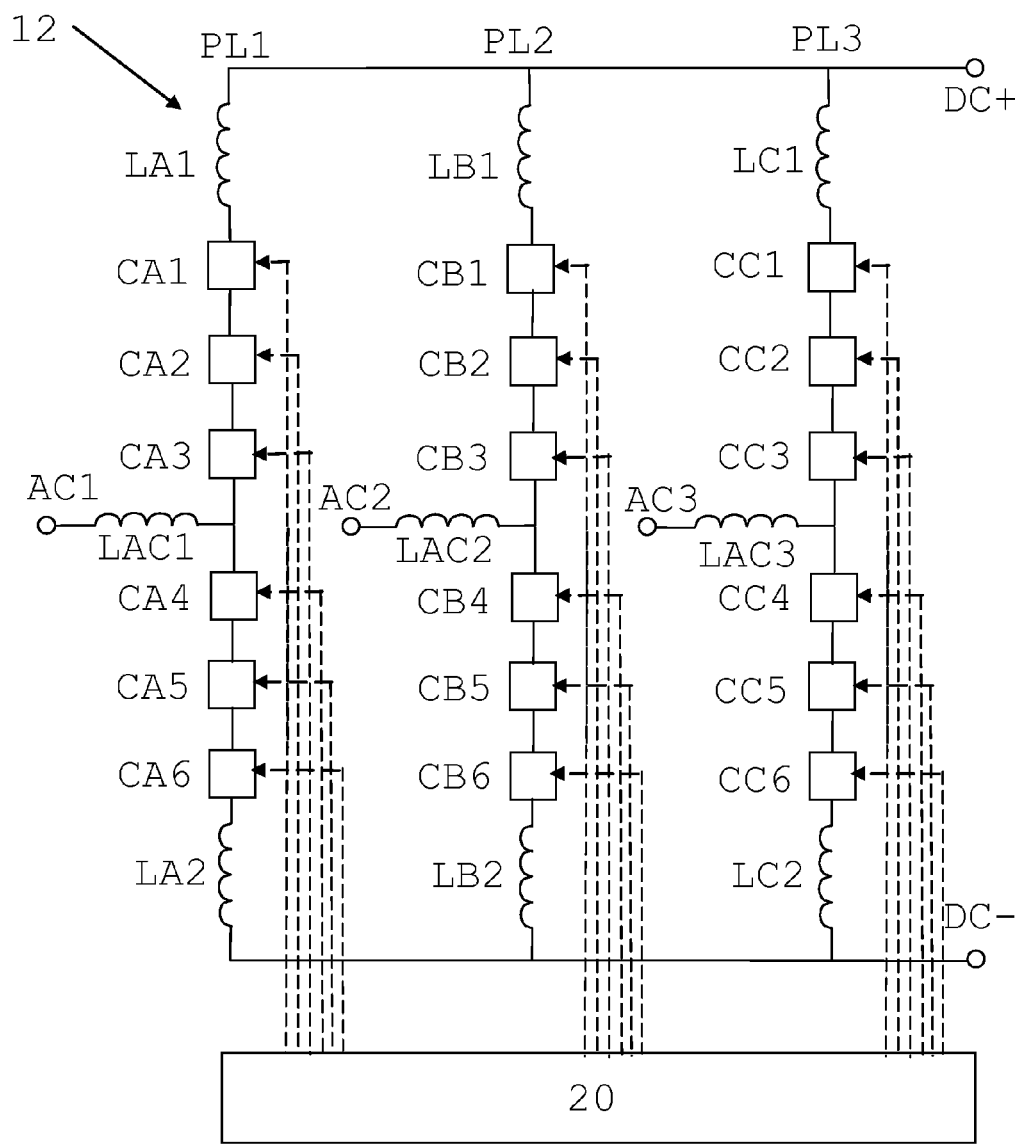

FIG. 2 shows a block schematic outlining an example of a voltage source converter 12. The voltage source converter 12 here includes a group of branches in the form of phase legs connected in parallel between two DC terminals DC+ and DC− for connection to the DC power transmission system. In the example given here there are three such branches or phase legs PL1, PL2, PL3 in order to enable connection to a three-phase AC transmission system. It should however be realized that as an alternative there may for instance be only two phase legs. Each phase leg PL1, PL, PL3 has a first and second end point. At each such end point there is provided a phase leg reactor LA1, LA2, LB1, LB2, LC1 and LC2. In the converter of the type depicted in FIG. 2 the first end points of all the phase legs PL1, PL2 and PL3 are connected to a first DC terminal DC+ while the second end points are connected to a second DC terminal DC−. Each phase leg is thus connected to the corresponding DC pole via a phase leg reactor LA1, LB1 and LC1 and LA2, LB2 and LC2. Each phase leg also includes a lower and upper phase leg half, sometimes also denoted phase arm, and at the junction where the halves of a leg meet, a three-phase AC connection terminal AC1, AC2 and AC3 is provided. An AC connection terminal id thus provided at a point in a phase leg between two poles and in this example at the midpoint between the poles. Each three-phase connection terminal AC1, AC2, AC3 is here connected to the corresponding phase leg via a respective inductor LAC1, LAC2, LAC3.

The two DC terminals DC+ and DC− here make up the DC side of the voltage source converter 12, while the AC terminals AC1, AC2 and AC3 make up the AC side of the voltage source converter.

The voltage source converter is according to the present invention realized through a number of voltage source converter cells being connected to each other in cascade in the phase legs and stretching between the two DCD poles. The voltage source converter is thus a cell based voltage source converter. These cells comprise switching elements and a capacitor, a cell capacitor.

In the present example there are three cells in each phase leg half. Thus the upper half of the first phase leg PL1 includes three cells CA1, CA2 and CA3, while the lower half of the first phase leg PL1 includes three cells CA4, CA5 and CA6. In a similar fashion the upper half of the second phase leg PL2 includes three cells CB1, CB2 and CB3, while the lower half of the second phase leg PL2 includes three cells CB4, CB5 and CB6. Finally the upper half of the third phase leg PL3 includes three cells CC1, CC2 and CC3, while the lower half of the third phase leg PL3 includes three cells CC4, CC5 and CC6. The numbers are here only chosen for exemplifying the principles of the present invention. It is often preferred to have many more cells in each phase leg, especially in HVDC applications.

In FIG. 2 there is also a control unit 20 controlling the cells of the converter. The control unit 20 controls the switching elements of the cells for converting AC power to DC power or vice versa. This control will be described in more detail later.

Figure 3:
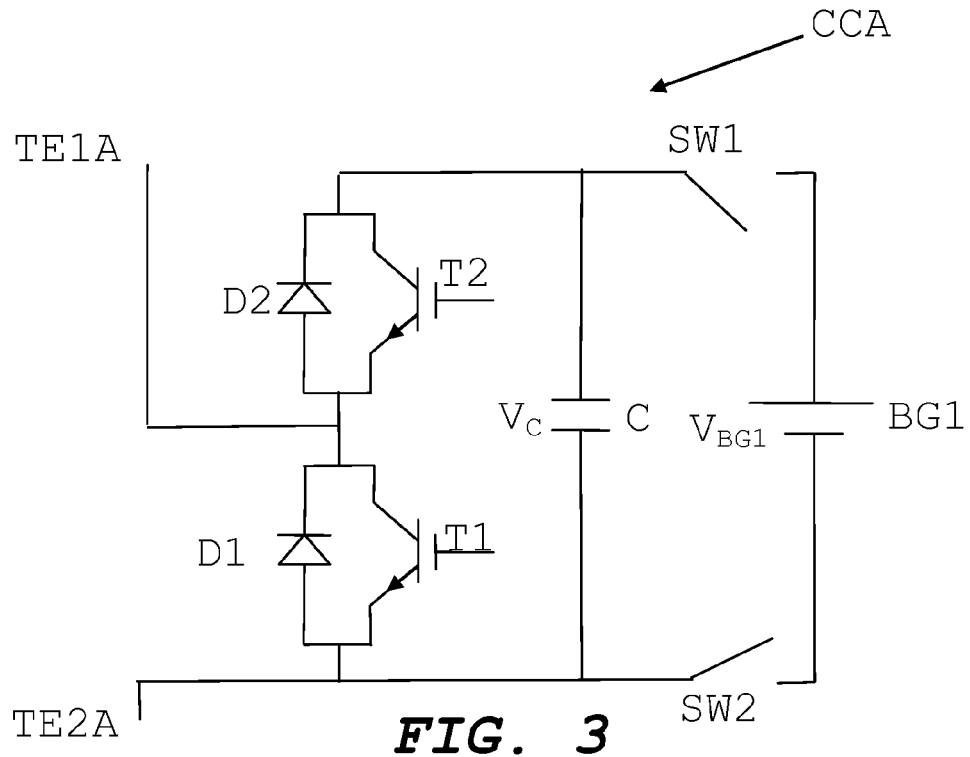

FIG. 3 schematically shows a first type of converter cell CCA that may be used in the voltage source converter shown in FIG. 2. The cell CCA is a half-bridge converter cell and includes an energy storage element, here in the form of a capacitor C, which is connected in parallel with a first string of switching elements T2 and T1. The switching elements in the first string are connected in series with each other. The first string here includes a first switching element T1 and a second switching element T2, where each switching element may be realized in the form of an IGBT (Insulated Gate Bipolar Transistor) transistor. There are also rectifying elements connected in anti-parallel with the switching elements, where the rectifying elements may typically be diodes. There is thus a first switching element T1 with anti-parallel first rectifying element D1 and a second switching element T2 with anti-parallel second rectifying element D2. In FIG. 3 the second switching element T2 is connected with the collector to a first end of the cell capacitor C and with the emitter to the collector of the first switching element T1, the emitter of which is connected to a second end of the cell capacitor C. The second rectifying element D2 is connected between emitter and collector of the second transistor T2 and conducting current in a direction from the emitter towards the collector of the second switching element T2. The first rectifying element D1 is connected in the same way between the emitter and collector of the first switching element T1.

The cell has a first connection terminal TE1A and a second connection terminal TE2A, each providing a connection for the cell to a phase leg of the voltage source converter. In this first type of cell the first connection terminal TE1A more particularly provides a connection from the phase leg to the junction between the first and the second switching elements T1 and T2, while the second connection terminal TE2A provides a connection from the phase leg to the junction between the first switching element T1 and the cell capacitor C. These connection terminals TE1A and TE2A thus provide points where the cell can be connected to the phase leg. The first connection terminal TE1A thus joins the phase leg with the connection point or junction between two of the series connected switching elements of the first string, here the first and second switching elements T1 and T2, while the second connection terminal TE2A joins the phase leg with a connection point between the first string of series connected switching element and the cell capacitor C, which is here the connection point between the first switching element T1 and the second end of the cell capacitor C. The cell capacitor C is also shown as having a voltage $V_C$.

It can be seen that the cell also includes a battery module group BG1, which in a first embodiment of the invention includes only one battery module or battery cell. The battery module group BG1 is here placed in parallel with the cell capacitor C and a first end of the battery module group BG1 is connected to the first end of the cell capacitor C via a first disconnector or switch SW1, while a second end of the battery group BG1 is connected to the second end of the cell capacitor via a second disconnector or switch SW2. These disconnectors or switches can be selectively controlled to connect the battery module group BG1 in parallel with the cell capacitor C. The battery module group BG1 is thus connectable in parallel with the cell capacitor C, i.e. it can get connected in parallel with the cell capacitor C. The battery module group BG1 is here shown as having a voltage $V_{BG1}$.

Figure 4:
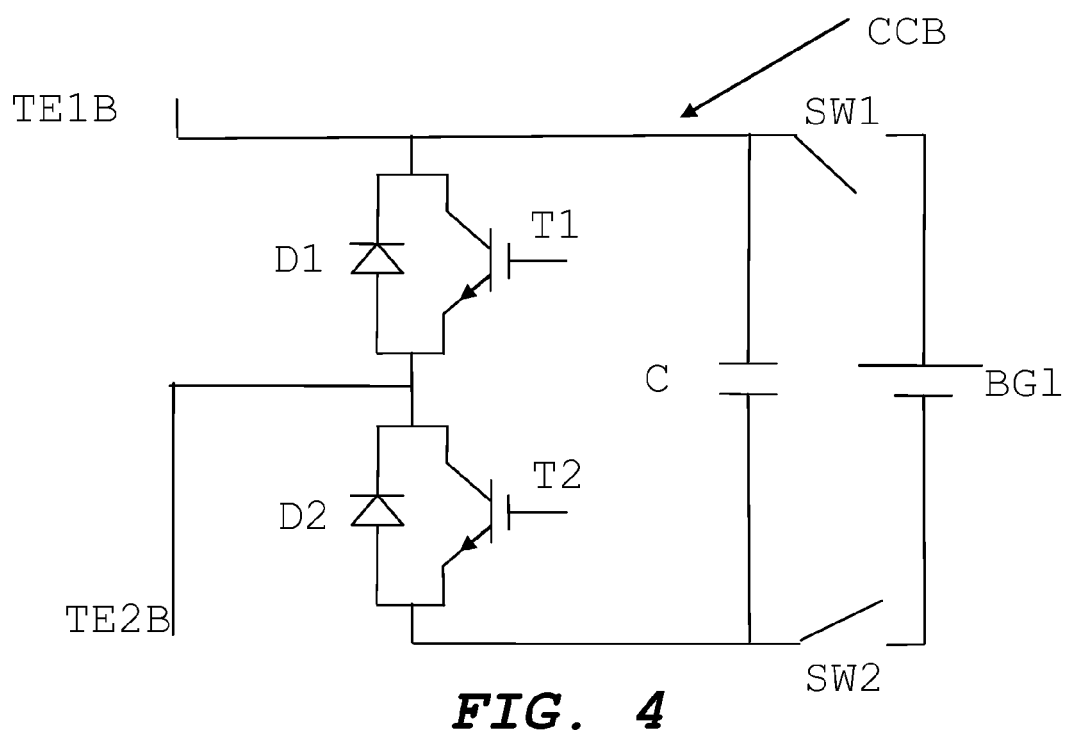

FIG. 4 schematically shows a second type of half-bridge converter cell CCB having the same type of elements as the first type and being interconnected in the same way, i.e. including a cell capacitor C and a battery module group BG1 in the same way as in FIG. 3. However, here the first switching element T1 with antiparallel first rectifying element D1 is followed by the second switching element T2 with second anti-parallel rectifying element D2. There is also in this second type of cell CCB a connection terminal TE2B, a second connection terminal, which provides a connection between the branch and the connection point between the first and the second switching elements T1 and T2 as well as a connection terminal, a first connection terminal TE1B, which provides a connection between the branch and the junction between the first switching element T1 and the first end of the cell capacitor C.

As a further alternative, it is possible that the cells are full-bridge cells, where there are two strings with switching elements and anti-parallel rectifying elements in parallel with a cell capacitor and battery module group. In such a cell one cell terminal is provided at the midpoint of one string and the other at the midpoint of the other string of switching elements and anti-parallel rectifying elements.

The battery module groups of the cells here together provide an energy storage system for supporting an AC system. Each cell may be provided with a battery module group. As an alternative it is possible that only some cells are equipped with battery module groups.

In normal control of the cells, i.e. if the battery module group BG1 is for a moment disregarded, the converter control unit 20 in FIG. 2 controls the switching elements of the cells for converting AC power to DC power or vice versa. This is typically done through controlling the switching elements of the cells to cause the cells to make a voltage contribution that is the voltage over the cell $V_C$ or a zero voltage. In this way it is possible to make a phase leg provide a sinusoidal wave at the AC terminals of the converter.

According to the invention the control unit has a further control function. It has the function of supporting an AC system. How this may be done will now be described also with reference being made to FIG. 5, which shows a block schematic of the control unit 20 of the voltage source converter.

The control unit 20 comprises a switching element control block 21, which is a control block provided for performing ordinary cell control, i.e. to control the cells for forming an AC voltage at the AC terminals AC1, AC2 and AC3 of the converter. This block 21 decides which switching elements are to be controlled and then provides a control signal T_CTRL for controlling the switching elements according to known principles. The control unit 20 is also provided for controlling the energy storage system. It is more particularly provided for selectively connecting battery module groups of a number of cells in parallel with corresponding cell capacitors for exchanging power with an associated AC system. In order to control the energy storage system, the control unit 20 furthermore comprises a power requirement determining block 22 receiving an indication of an AC system conditions AC_SC and determining a power requirement in the AC system. It also includes a battery module control block 24 connected to the power requirement determining block 22. The battery module control block 24 receives power requirement data PR from the power requirement determining block 22 as well as active cell data AC_D from the switching element control block 21 and provides a control signal SW_CTRL for the battery module disconnectors or switches in the cells. The battery module control block 24 is thus configured to control the switches of a cell for connecting a battery module group in parallel with a corresponding cell capacitor. It also provides a voltage modification signal V_M to the switching element control block 21 in order for this block to control the direction of power transfer in relation to battery module groups of some selected cells using their switching elements.

Figure 5:
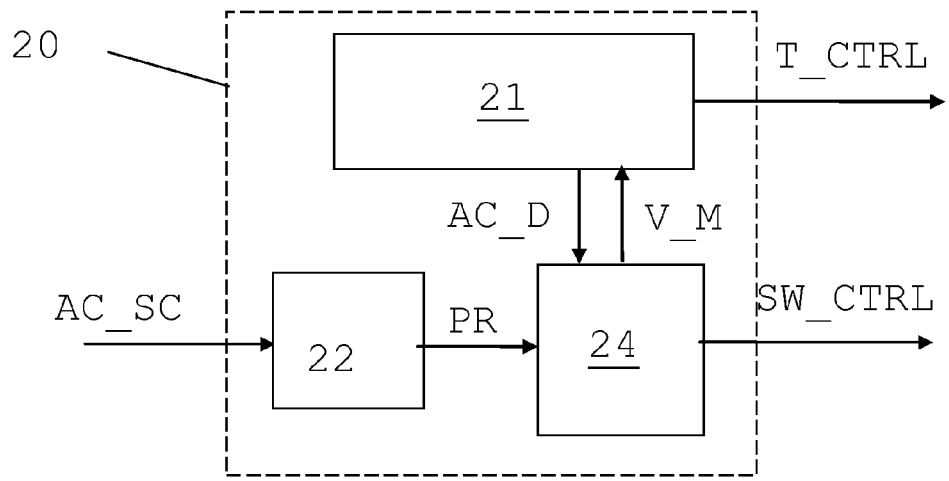
FIG. 5 shows a block schematic outlining the control unit of the voltage source converter, FIG. 6 schematically shows a flow chart including a number of method steps in a method for supporting an AC system and being performed by the control unit, FIG. 7 schematically shows a second group of battery modules that can be used in the cells, and FIG. 8 schematically shows a data carrier carrying program code for implementing the control unit.
Figure 6:
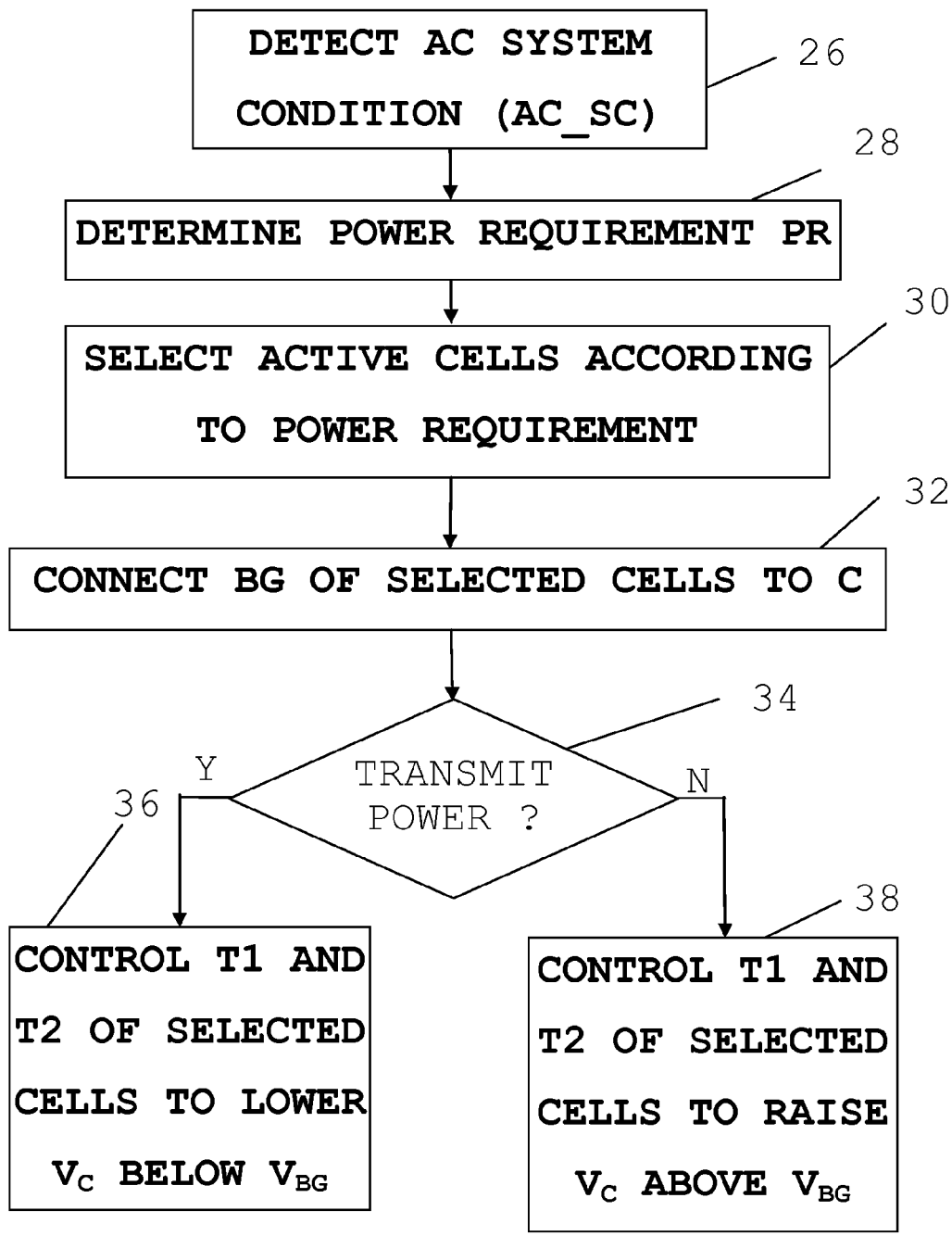

The invention will also be described with reference being made to FIG. 6, which shows a flow chart of a number of method steps being performed by the AC system stabilizing element 21 shown in FIG. 5.

The invention will now be described in relation to the first converter 12 because it includes cells with battery module groups. It should however be realized that the second converter 16 may also or instead include such cells and may also be operated in the same way as the first converter in addition to or instead of the first converter.

An AC system associated with the first converter, which may be the AC system comprising the first AC conductor 10 and being directly connected to the first converter 12 may be an AC system needing support, for instance a weak system. It should however be realized that the system needing support could also be the second AC system including the second AC power line 18. The AC system receiving such support by the first converter, is here an associated AC system, i.e. a system associated with the converter having cells equipped with battery module groups.

This support can involve the exchange of power with the associated AC system, such as the receiving and storing of power generated by the associated AC system as well as providing power to the associated AC system.

There are a number of support activities that may be needed, where one exemplifying is power shaving. If the associated AC power system is supposed to provide a certain power level then excess power may in this case be temporarily stored in an energy storage system and if the associated AC system is unable to provide the power level then power is supplied to it from battery modules of the energy storage system.

Energy storages such as energy storages using battery modules can be integrated into the DC system. The normal way they would be provided would then be to connect the battery modules to the DC power line 14 via a Power Electronics Interface. This connection would normally require a DC-DC converter because of the high voltages of the DC system and the relatively low voltages used by the battery modules. It would furthermore possibly require galvanic isolation. This makes the energy storage system connection expensive and complex and does furthermore not really improve on the situation of connecting the battery modules to the AC line via a separate AC/DC converter as described in the background of the invention.

According to the principles of the present invention the use of such an additional DC/DC converter in the DC system or an additional AC/DC converter outside the DC system is avoided through placing the battery module groups of the energy storage system in cells of the first voltage source converter. However, then some considerations may have to be made regarding how the cells are controlled or operated.

In order to support the associated AC system, it is necessary to know the support needed.

The method of the invention therefore starts with the power requirement determining block 22 of the control unit 20 obtaining data of a power requirement in the AC system needing support. This is in the first embodiment performed through detecting an AC system condition, step 26. This may be done through the power requirement determining block 24 obtaining measurements of the AC power system, such as voltage and current, and the block 22 then determines a power requirement based on these measurements, step 28. The power requirement may typically be a requirement to feed power to the AC system or to receive power from the AC system. There is thus a requirement for a transfer of power in a direction to or from the energy storage system made up of the battery module groups of the cells. Data PR on the required power is then transferred from the power requirement determining block 22 to the battery module control block 24. Here it should be realized that as an alternative it is possible that the power requirement is determined somewhere else than in the converter. The power determining block may for instance be a part of the AC system needing support from where the power requirement data is sent to the battery module control block 24. The power requirement determining block can therefore in some variations of the invention be left out from the control unit 20.

The battery module control block 24 also receives data AC_D of which cells are being active from the switching element control block 21. The active cells are the cells that connect their cell capacitors into the phase legs for providing a cell voltage contribution $V_C$ to an AC terminal AC1, AC2 and AC3. This means that cells providing a zero voltage contribution are not possible to use. The battery module control block 34 more particularly selects cells based on power requirement and which cells are active. It thus selects active cells according to the power requirement, step 30. It thus selects active cells for fulfilling the power requirement. This may here involve selecting cells based on if they are active and the size of the possible contribution the battery module groups of these cells can make to fulfill the power requirement. Cells are furthermore typically active, i.e. switched on and off for providing a cell voltage contribution, according to a switching scheme used in the conversion. It is possible to consider also this switching scheme for the cells in the selection of which battery module groups that are to contribute to the meeting of the power requirement.

It can as an example be mentioned that there is typically a switching scheme used in the period of forming an AC voltage so that the cells are switched on and off as seldom as possible. It is thus possible to consider this fact in the selection of cells. This means that if there is a need for battery module groups to receive and temporarily store power in a given time interval, the battery module control block 24 may with advantage select cells that are active the longest in the time interval before those that are to be active a shorter time. This may further be combined with considering the amount of power these battery module groups are able to absorb or deliver.

Based on these determinations the battery module control block 24 then sends one or more control signals SW_CTRL to the switches or disconnectors SW1 and SW2 of the selected active cells. The battery module groups of the selected active cells are then connected to the cell capacitors, step 32, i.e. connected in parallel with the cell capacitors C.

Thereafter or at the same time the cells are controlled to receive or deliver power based on the determined power requirement. If for instance the battery module groups are to transmit power to the associated AC system, step 34, then the switching elements T1 and T2 of the cells are controlled so that the voltage $V_C$ across the cell capacitor C is lowered below the battery module group voltage $V_{BG1}$, step 36. In case power is to be received by the battery module groups instead, step 34, then the switching elements T1 and T2 of the selected cells are controlled so that the voltage $V_C$ across the cell capacitor C is raised above the battery module group voltage $V_{BG1}$, step 38. This is in this embodiment done through the battery module control block 24 sending a voltage modification signal V_M to the switching element control unit 21 indicating which battery module groups of which active cells that have been selected as well as the direction of power transfer that is to be used for the selected battery module groups, i.e. if power is to be transferred to or from the selected battery module groups. The switching element control unit 21 then controls the switching elements of the cells that harbor the selected battery module groups for raising or lowering the voltage across the corresponding cell capacitors in the above described way.

In this way it can be seen that it is possible to deliver power in and out of the selected active cells in order to support the associated AC system. In this way it is possible to support the associated AC system through exchanging power with it, i.e. through either receiving power from it or feeding power to it.

It can in this way be seen that the battery module groups can be used to support an associated AC system.

This may then be used for supporting the AC system in a number of different ways. The support may for instance concern transmission enhancement, power oscillation damping, dynamic voltage stability, tie line control, short-term spinning reserve, load leveling, under-frequency load shedding reduction, sub-synchronous resonance damping, power quality improvement, peak shaving, black start, strengthening of weak grid connections, integration of renewable energy sources and power compensation.

In the example above the battery module group included only one battery module. It can however include parallel strings of battery modules or battery modules connected in series with each other.

Figure 7:
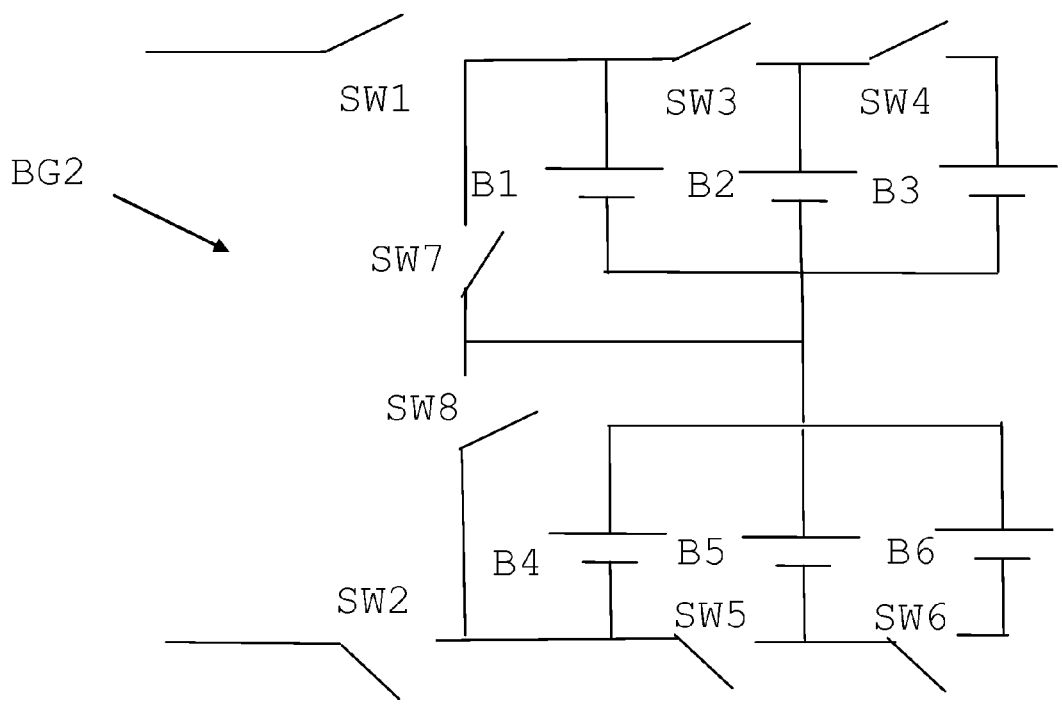

In an embodiment of the invention a battery module group BG2 includes battery modules that may be connected both in series and in parallel with each other for contributing to the exchange of power with the associated AC system. This is shown in FIG. 7. Here there is a first and second switch SW1 and SW2 as before connected between the two ends of the cell capacitor (not shown) and the battery module group BG2. There are three parallel branches of battery modules B1, B2 and B3 connected to the first switch SW1, where one end of a first battery module B1 connected to the first switch SW1 is joined to an end of a second battery module via a third switch SW3 and the first end of the second battery module B2 is joined to an end of the third battery module via a fourth switch SW4. The other ends of the first second and third battery modules are joined together and lead to three further parallel branches of battery modules B4, B5 and B6, having ends joined to the second switch SW2 in the same way as the battery modules of the first mentioned branches via switches SW5 and SW6. Here there is also a seventh switch SW7 leading from the first switch SW1 to the junction between the different sets of parallel branches as well as an eighth switch SW8 leading from the second switch to the junction between the different sets of parallel branches.

With this type of battery module group it is possible to connect battery modules in parallel and/or in series. It is because of this possible to more finely tune the power exchanged with the AC system according to the power requirement.

The switching elements used in the cells have been described as employing transistors. These are with advantage IGBTs. It should be realized that other types of switching elements may be used, such as elements based on thyristors, MOSFET transistors, GTOs (Gate Turn-Off Thyristor) or IGCTs (Integrated Gate Commuted Thyristor). Also the controllable rectifying elements may be provided as GTOs or IGCTs.

The connections of the battery modules have been described as being performed via switches or disconnectors. It should here be realized that it is possible with other types of mechanical interfaces.

Figure 8:
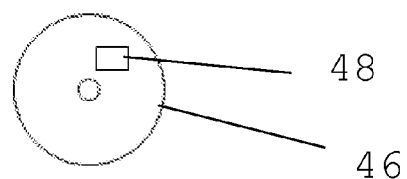

The control unit need not be provided as a part of a voltage source converter. It can be provided as a separate device that provides control signals to the voltage source converter. This control unit may be realized in the form of discrete components as indicated in FIG. 7. However, it and the blocks it includes may also be implemented in the form of a processor with accompanying program memory comprising computer program code that performs the desired control functionality when being run on the processor. This computer program product can be provided as a data carrier such as one or more CD ROM discs or one or more memory sticks carrying computer program code, which performs the above-described current limitation control functionality when being loaded into a control unit of a voltage source converter. On such data carrier in the form of a CD ROM disk with a computer program 48 carrying such computer program code is schematically shown in FIG. 8.

From the foregoing discussion it is evident that the present invention can be varied in a multitude of ways. It shall consequently be realized that the present invention is only to be limited by the following claims.

The invention claimed is:

1. A method for supporting an AC system via a cell based voltage source converter, said converter having an AC side connected to an AC power line of the AC system and a DC side connected to a DC power line of a DC power transmission system and a group of phase legs connected in parallel between two DC poles for connection to the DC power transmission system, the phase legs further comprising cells connected to each other in cascade, where each cell comprises a string of switching elements in parallel with a cell capacitor and each of at least some cells further include a battery module group comprising at least one battery module connectable in parallel with the cell capacitor, the method comprising the steps of:
controlling the switching elements of the cells for converting AC power to DC power or vice versa,
obtaining data regarding a power requirement of the AC system via measurements of the AC power system,
selecting battery module groups of a number of active cells for fulfilling the power requirement, the selecting of battery module groups being made in dependence on the power needed for fulfilling the power requirement and a cell switching scheme used in the converter and comprising selecting cells that are active the longest in a given time interval before those that are active a shorter time, and
connecting the selected battery module groups in parallel with corresponding cell capacitors for exchanging power with the AC system.

2. A method according to claim 1, further comprising the step of controlling the switching elements of a cell for controlling the direction of power transfer in relation to the corresponding battery module group.

3. A method according to claim 2, wherein the step of controlling the switching elements of a cell comprises controlling the switching elements of a cell to lower the voltage ($V_C$) over the cell capacitor below the voltage ($V_{BG1}$) of the corresponding battery modules group when feeding power to the associated AC system.

4. A method according to claim 2, wherein the step of controlling the switching elements of a cell comprises controlling the switching elements of a cell to raise the voltage ($V_C$) over the cell capacitor above the voltage ($V_{BG1}$) of the corresponding battery module group for receiving power from the associated AC system.

5. A method according to any previous claim 1, wherein the step of obtaining data regarding a power requirement of the associated AC system comprises the steps of detecting an AC system condition and determining the power requirement based on the detected AC system condition.

6. A method according to any previous claim 2, wherein the step of obtaining data regarding a power requirement of the associated AC system comprises the steps of detecting an AC system condition and determining the power requirement based on the detected AC system condition.

7. A method according to any previous claim 3, wherein the step of obtaining data regarding a power requirement of the associated AC system comprises the steps of detecting an AC system condition and determining the power requirement based on the detected AC system condition.

8. A method according to any previous claim 4, wherein the step of obtaining data regarding a power requirement of the associated AC system comprises the steps of detecting an AC system condition and determining the power requirement based on the detected AC system condition.

9. A voltage source converter for supporting an associated AC system and comprising:
an AC side connected to an AC power line of the AC system and a DC side connected to a DC power line of a DC power transmission system,
a group of phase legs connected in parallel between two DC poles for connection to the DC power transmission system,
the phase legs further comprising cells connected to each other in cascade, each cell comprising a string of switching elements in parallel with a cell capacitor, at least some cells further including a battery module group comprising at least one battery module connectable in parallel with the cell capacitor, and a control unit configured to control the switching elements of the cells for converting AC power to DC power or vice versa and to selectively connect the battery module groups of a number of cells in parallel with corresponding cell capacitors for exchanging power with the associated AC system via measurements of the AC power system wherein the control unit comprises a power requirement control block configured to determine the power requirement from a system condition based on measurements of the AC power system, wherein the control unit is configured to select battery module groups of a number of active cells for fulfilling the power requirement and a cell switching scheme used in the converter, the selecting comprising selecting cells that are active the longest in a given time interval before those that are active a shorter time.

10. A voltage source converter according to claim 9, wherein each battery module group is connected to one end of the cell capacitor via a first switch.

11. A voltage source converter according to claim 10, wherein each battery module group is connected to the other end of the cell capacitor via a second switch.

12. A voltage source converter according to claim 10, wherein the control unit comprises a battery module control block configured to control the switches of a cell for connecting a battery module group in parallel with the corresponding cell capacitor.

13. A voltage source converter according to claim 9, wherein the battery module group of at least one cell includes a number of battery modules connectable in series for contributing to the exchange of power with the AC system.

14. A voltage source converter according to claim 9, wherein the battery module group of at least one cell includes a number of battery modules connectable in parallel with each other for contributing to the exchange of power with the AC system.

15. A voltage source converter according to claim 9, wherein the control unit comprises a switching element control block configured to control the switching elements of a cell for controlling the direction of power transfer in relation to the corresponding battery module group.

16. A voltage source converter according to claim 15, wherein the switching element control block is configured to control the switching elements of a cell to lower the voltage ($V_C$) over the cell capacitor below the voltage ($V_{BG1}$) of the corresponding of battery module group when feeding power to the associated AC system.

17. A voltage source converter according to claim 15, wherein the switching element control block is configured to control the switching elements of a cell to raise the voltage ($V_C$) over the cell capacitor above the voltage ($V_{BG1}$) of the corresponding of battery module group for receiving power from the associated AC system.

18. A voltage source converter according to claim 11, wherein the control unit comprises a battery module control block configured to control the switches of a cell for connecting a battery module group in parallel with the corresponding cell capacitor.

19. A voltage source converter according to claim 10, wherein the battery module group of at least one cell includes a number of battery modules connectable in series for contributing to the exchange of power with the AC system.

20. A non-transitory computer program product for supporting an AC system associated with a cell based voltage source converter, said converter having an AC side connected to an AC power line of the AC system and a DC side connected to a DC power line of a DC power transmission system and a group of phase legs connected in parallel between two DC poles for connection to the DC power transmission system, the phase legs further comprising cells connected to each other in cascade, where each cell comprises a string of switching elements in parallel with a cell capacitor and at least some cells further includes a battery module group comprising at least one battery module connectable in parallel with the cell capacitor, the computer program product comprising a data carrier with computer program code being loadable into a control unit of the voltage source converter, said computer program code causing the control unit to, when being loaded in said control unit, control the switching elements of the cells for converting AC power to DC power or vice versa, obtain data regarding a power requirement of the associated AC system via measurements of the AC power system, select battery module groups of a number of active cells for fulfilling the power requirement, the selecting of battery module groups being made in dependence on the power needed for fulfilling the power requirement and a cell switching scheme used in the converter and comprising selecting cells that are active the longest in a given time interval before those that are active a shorter, and connect the selected battery module groups in parallel with corresponding cell capacitors for exchanging power with the associated AC system.

\* \* \* \* \*